June 3, 1930.   W. W. MALLOY   1,761,674

WAVE MOTOR

Filed April 25, 1928    2 Sheets-Sheet 1

INVENTOR,
W. W. Malloy,
BY F. E. Maynard
ATTORNEY.

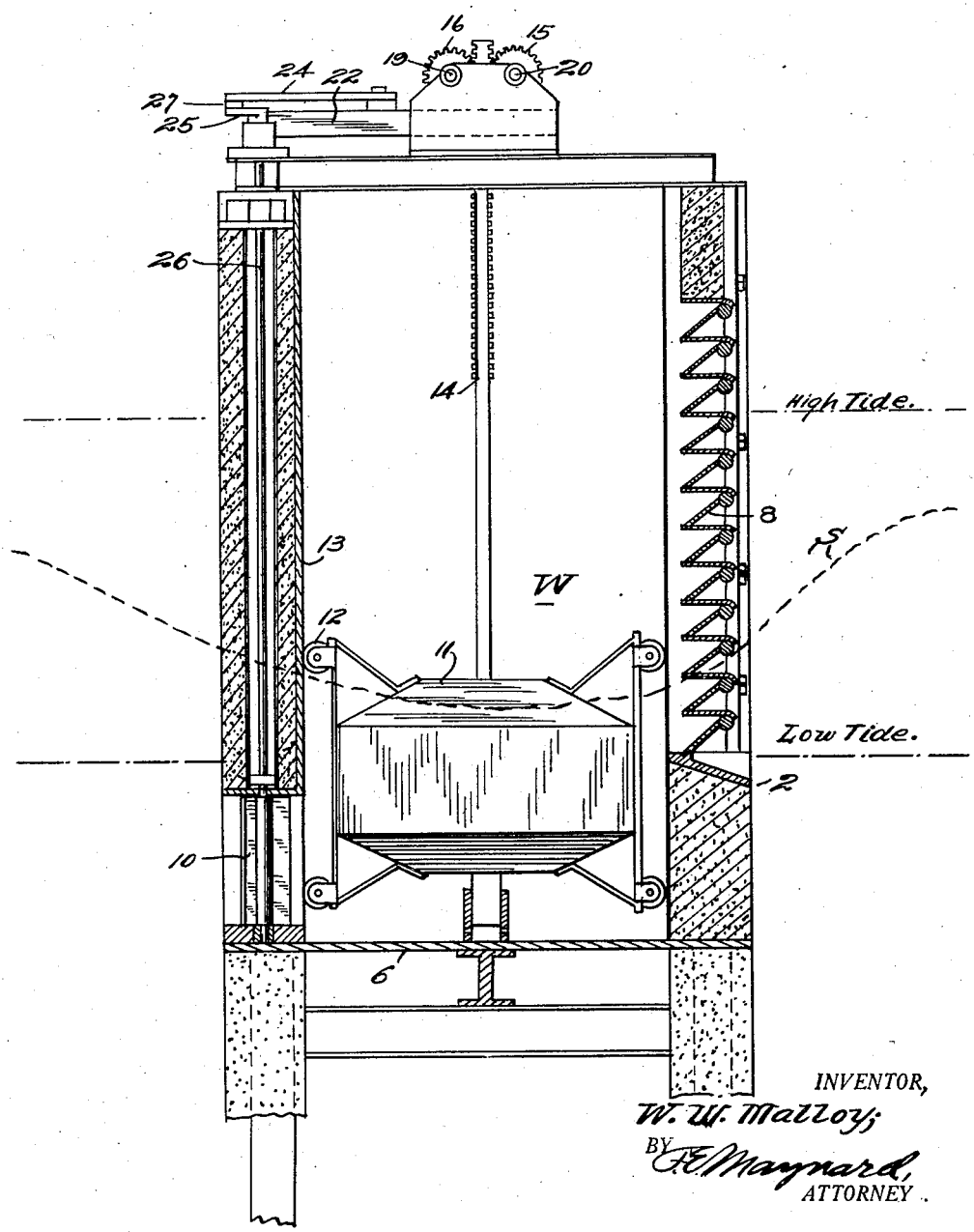

Patented June 3, 1930

1,761,674

UNITED STATES PATENT OFFICE

WILLIAM W. MALLOY, OF SAN PEDRO, CALIFORNIA

WAVE MOTOR

Application filed April 25, 1928. Serial No. 272,765.

This invention relates to power generators and more especially to a motor having a buoyant element tending to rise when submerged in water and falling under force of gravity when the buoying water passes away.

I am well aware that numerous attempts have been made to operate floats by momentum forces in water and to derive power from floats depending directly upon the rising and falling wave body. My present invention differs from all of these in principle and operates on a system wherein wave water is freely trapped or impounded in a well as each wave sweeps by and a float is submerged in the impounded water and tends to rise and to automatically act to release the trapped water at the maximum lift moment so that the well water may run off in the trough of the passed wave which flooded the well.

It will be seen from this that the float does not ride on a rising and falling wave but automatically ascends when and as the wave surges freely into the well and then gradually descends on the trapped body of water as this is run off at spill-valves.

Therefore, an object of this invention is to provide a method and means for conserving power inherent in water wave phenomena, by impounding wave water in a well and then releasing it after it has reached its maximum head and causing a float to be elevated and then permitted to fall under its own weight and do work.

Other objects, advantages and features of construction, combination and details of means will be made manifest in the following specification of the herewith illustrative embodiment; it being understood that modifications, variations and adaptations may be resorted to within the spirit, scope and principle of the invention as it is more directly claimed hereinafter.

Figure 3 is a vertical, diametrical section of the unit.

Figure 1:
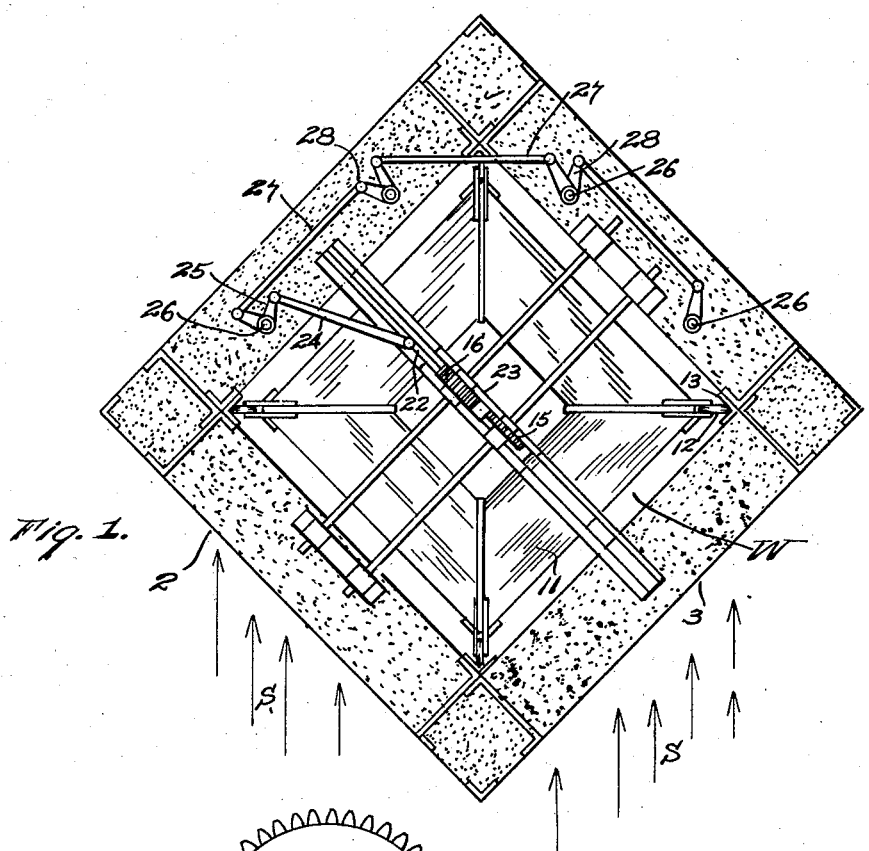
Figure 1 is a top plan of one unit of the apparatus.

In carrying out my invention wave water is permitted to freely surge into an isolated, column-like well here shown as of rectangular form in plan and having two front sides 2—3 set toward the sea waves S and having its two rear faces set shoreward but the well is built far out so as not to be obstructive to or disturbed by wave action at and along the shore.

The bottom of the well W is permanently closed by a floor 6.

The front walls of the well are provided with inwardly opening check valves 8 of any desired or appropriate type which will admit of rapid inflow of a large volume of water at any tide level and wave height so that the maximum of water will be impounded from each passing wave, both from its natural height and its momentum.

The shoreward walls of the well have a suitable spill valve means including valve members 10 which are opened and closed by mechanism under direct control of a float 11 confined in the well for vertical action and having antifriction wheels 12 tracking on vertical rails 13.

The float 11 has a jack-rack 14 toothed on opposite faces to constantly mesh with head gears 15—16 which have ratchet means 17 operative, each, in one direction to drive hubs 18 which are keyed on respective shafts 19—20 and from which the conserved power is transmitted in any desired manner, as to a main shaft common to all of the units or prime movers in a battery.

Under wave velocity water will readily flow in past the inlet valves 8 until the crest of the waves passes and then these valves will close. At this time the spill-valves are closed and the water is therefore trapped.

When the float 11 is carried to its highest degree as determined by wave height plus momentum of the rising float this latter instantly reverses motion and as this occurs one wheel, as 16, will encounter a yielding pawl 21 carried by a shift-bar 22 slidably mounted in the head frame 23, and force this bar endwise. The bar 22 is connected by a link 24 to a crank 25 of a valve shaft 26 of which a number carries the spill-valves 10.

Means are provided to open or close all valves 10 at the same time and includes a system of links 27 and bell-cranks 28 attached to the vertical shafts 26. It is understood that this is but an illustrative form of valve actuating mechanism.

Figure 2:
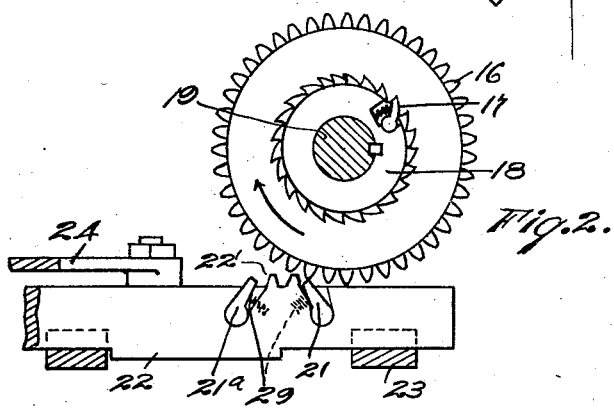
Figure 2 is a detail of a spill-valve actuating mechanism.

The shift bar 22 has a few fixed teeth 22' to mesh with the gear 16 following mesh of the pawl 21 and also has a reverse pawl 21ª pitched to mesh with the gear 16 as the bar moves to the right, Fig. 2. The function of the pawls is to initiate mesh with the gear 16 at the instant this starts a motion in either direction and the pawls are yieldable in one direction against their springs 29 to allow the gear 16 to spin by as it runs in the yielding direction of the pawls. As the gear reverses, the contiguous pawl will lock in place as a tooth and drive the bar to the right or to the left as determined by the respective pawls which are of reverse actions in their pockets which limit pawl action to tooth-forming position under impulse of their springs 29.

In action, when the float starts down it causes the shift bar 22 to pull the spill-valves open so that the well water will fall in the trough of the passing wave. The spill-valves 10 will always be below the low tide level and as the float descends its momentum will carry it a little below its true buoy level in the well and the float will move up to this before the approaching wave will impound in the well. This recovery action will be sufficient to close the spill-valves before wave entry into the well.

What is claimed is:

1. Power conserving apparatus including an impounding well in a body of water subject to wave action, a buoyant body vertically operative in the well, check valve means in the wave side of the well to freely admit of wave inflow to submerge the said body, and means in the opposite side to discharge the trapped water, said check valve and discharge means being wholly independent of each other.

2. Power conserving apparatus including an impounding well in a body of water subject to wave action, a buoyant body in the well, valve means in a vertical wave-facing wall for the free admission of wave water to submerge said body, and spill valve means actuated and controlled by said body independently of the inlet valves.

3. Power conserving apparatus including an impounding well in a body of water subject to wave action, freely acting inlet valve means for admitting wave water into the side of the well at various wave heights, float actuated valve means for discharging the impounded water, and a power transmitting float in the well operative to rise in the impounded water and gravitate when it is discharged, the inlet valves being disposed in a vertical system and higher than the discharge valves.

4. Power conserving apparatus including an impounding well in a body of water subject to wave action, inlet check-valve means for admitting water into the well, spill-valves for discharging the impounded water, and a power transmitting float operative in the well; said inlet valve means being disposed in a vertical plane in the zone of sweep of waves at normal tides and positively controlled means connecting the spill-valves and the float; the inlet valve means being independent of the spill-valves.

5. In a wave motor, a float, a well in which it is operative and having a system of spill-valves, and means for operating the spill-valves and including a float driven wheel, a lever mechanism connected to the valves, and a double action device including a member connected to said mechanism and operatively engaging and reciprocative by said wheel in each of its movements.

6. In a wave motor, a float, a well in which it is operative and having a system of spill-valves, and means for operating the spill-valves and including a float driven wheel, a lever mechanism connected to the valves, and a double action device including a bar connected to said mechanism and having escapement pawls to respectively catch on said wheel upon reverse oscillations thereof and whereby said mechanism is actuated.

WILLIAM W. MALLOY.